United States Patent
Lein et al.

(10) Patent No.: US 7,798,031 B2
(45) Date of Patent: Sep. 21, 2010

(54) METHOD AND DEVICE FOR SHIFTING GEARS OF AN AUTOMATIC TRANSMISSION

(75) Inventors: Lars Lein, Kongsberg (NO); Jan Gunnar Royland, Holum (NO); Ole Andre Gjerpe, Kongsberg (NO); Christer Svenkerud, Kongsberg (NO)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 576 days.

(21) Appl. No.: 11/638,030

(22) Filed: Dec. 13, 2006

(65) Prior Publication Data

US 2007/0131048 A1    Jun. 14, 2007

(30) Foreign Application Priority Data

Dec. 14, 2005    (DE) .............. 10 2005 059 621

(51) Int. Cl.
*F16H 59/00* (2006.01)
*G05G 9/047* (2006.01)
*B60W 10/04* (2006.01)
*G06F 7/00* (2006.01)

(52) U.S. Cl. ............... 74/335; 74/473 XY; 477/34; 701/64

(58) Field of Classification Search .......... 477/34; 74/900, 335, 473 XY; 701/64
See application file for complete search history.

(56) References Cited

U.S. PATENT DOCUMENTS

| | | | |
|---|---|---|---|
| 6,520,039 B2 * | 2/2003 | Ogami et al. | 74/335 |
| 6,561,950 B1 * | 5/2003 | Ohtsuka | 477/124 |
| 6,865,467 B2 * | 3/2005 | Berger et al. | 701/51 |
| 7,448,291 B2 * | 11/2008 | Stengel et al. | 74/335 |
| 2002/0108457 A1 * | 8/2002 | Berger et al. | 74/335 |
| 2004/0112158 A1 * | 6/2004 | Norum et al. | 74/335 |
| 2004/0129100 A1 * | 7/2004 | Zimmermann et al. | 74/335 |
| 2006/0272436 A1 * | 12/2006 | Lein et al. | 74/335 |

FOREIGN PATENT DOCUMENTS

| | | |
|---|---|---|
| DE | 103 16 442 | 10/2003 |
| DE | 103 10 831 | 11/2003 |
| EP | 1 729 041 | 12/2006 |

* cited by examiner

*Primary Examiner*—Roger Pang
(74) *Attorney, Agent, or Firm*—Simpson & Simpson, PLLC

(57) ABSTRACT

In a method for shifting gears of an automatic transmission, in which a shift finger can be moved by a selective actuator along a selective path into various selective positions, out of which the shift finger can be moved via a shift actuator into different shift paths and the shift finger engages a gear each when it is moved into an end region of a shift path, the selective actuator is activated for verifying the correct function of the selective actuator and its connection to the shift finger prior to each engagement of a new gear within a shift path such that by approaching the edge of the shift gear the respective shift path is detected.

5 Claims, 3 Drawing Sheets

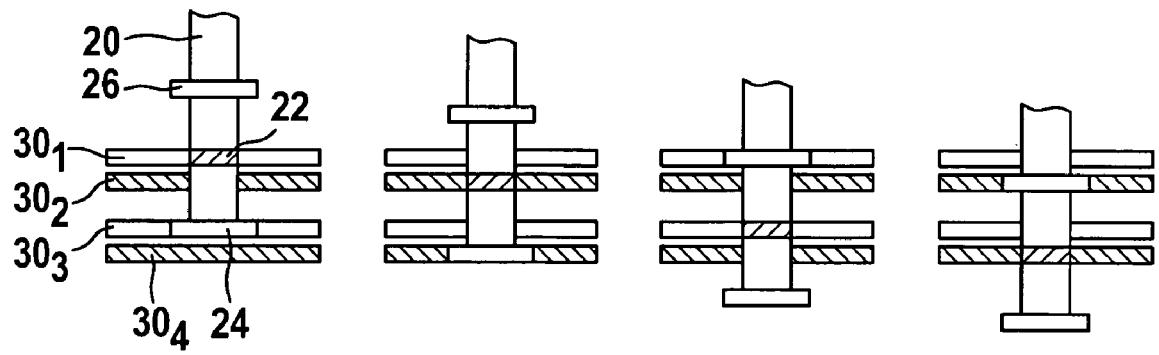
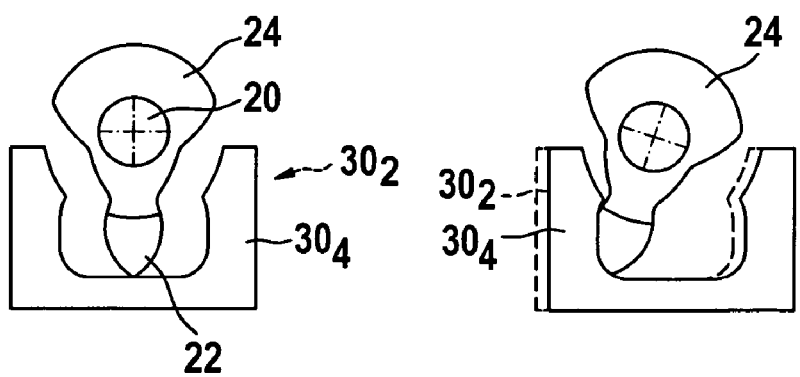
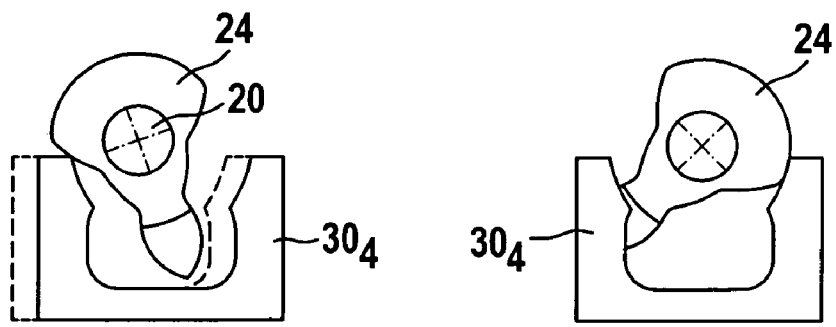

METHOD AND DEVICE FOR SHIFTING GEARS OF AN AUTOMATIC TRANSMISSION

CROSS REFERENCE TO RELATED APPLICATIONS

This patent claims priority of German Patent Application No. 10 2005 059 621.5 filed Dec. 14, 2005, which application is incorporated herein by reference.

FIELD OF THE INVENTION

The invention relates to a method and a device for shifting gears of an automatic transmission.

BACKGROUND OF THE INVENTION

Automated or automatic transmissions generally comprise a shift mechanism provided with a camshaft having a shift finger. Using a selecting actuator and a shift actuator, the camshaft can be moved such that the shift finger can be displaced along a selective path to different selective positions, out of which the shift finger can be displaced in shift paths, generally aligned perpendicularly to the selective path, with the help of a shift actuator. During the motion along a shifting path the shift finger takes along a shift bar, by which a gear can be engaged. Here, the shift bar can generally be moved from a central position into one direction for shifting one gear and into another direction for shifting another gear.

A problem arising in conventional shifting mechanisms is the fact that only after a gear has been set, for example, by the shifting bar contacting a stop, can it be determined which gear is actually engaged. When an error occurs in the control of the selecting actuator or its connection to the shift finger, it is possible for the shift finger to be in a position not intended, from which it then can be moved into an unintended shift path so that an unintended gear can be engaged. This can result in excessive rotations of the motor during shift-downs, to a stalling of the engine during shift-ups, or when erroneously engaging the reverse gear, even to an unintended change of the driving direction.

SUMMARY OF THE INVENTION

The invention provides a method for shifting gears of an automatic transmission, in which method a shift finger can be moved by a selecting actuator along a selective path into various selective positions, out of which the shift finger can be moved into different shift paths via a shifting actuator and the shift finger respectively engages a gear when it is moved into the end region of the shift path, in which method, in order to verify the correct function of the selective actuator and its connection to the shift finger, prior to each engagement of a new gear, the selecting actuator is activated for verification purposes within a shift path such that by approaching an edge of the shift path the respective shift path is detected.

Advantageously, the shift finger is moved back into the selective path after a gear is engaged without the gear engaged being disengaged.

In another advantageous embodiment of the method the selective actuator is activated for verification purposes when, during its motion along a shifting path, the shift finger reaches a synchronization position for synchronizing the respective path.

The shift finger can be moved into the selective path after a gear has been engaged and can be moved in the shift path for verifying a gear is still engaged.

The invention also comprises a device for shifting gears of an automatic transmission comprising a selective actuator, a shift actuator, a camshaft provided with at least one shift finger and a disengagement element, and at least two shift bars, with the camshaft being mobile by the selective actuator and the shift actuator such that the shift finger is moved along a selective path into selective positions allocated to the shift bars, out of which it can move into one of the shift paths, during the motion out of a selective position along a shift path in its end region the shift finger moves the allocated shifting bar for engaging a gear and the disengagement element moves during the engagement of the gear another shifting bar such that a gear allocated thereto is disengaged, at least one sensor for detecting the position of the shift finger in the selective direction and an electronic control device for controlling the selective actuator and the shift actuator, with the electronic control device controlling the selective actuator and the shift actuator according to an above-mentioned method.

Advantageously, the device according to the invention is provided in a parallel transmission.

The invention achieves a high level of shift security, because prior to engaging a new gear it can be verified if the shift finger is actually located in the shift path intended. This verification can occur rapidly and, in particular, in a parallel transmission, during waiting times so that the necessary shift time is not extended or hardly extended.

A general object of the invention is to improve shifting safety when shifting gears of an automatic transmission of the above-described type.

BRIEF DESCRIPTION OF THE DRAWINGS

In the following, the invention is explained in greater detail using schematic drawings where:

FIG. 3 is a top view to the arrangement according to FIG. 2 in various shift positions;

FIG. 4 is a top view to a part of the arrangement according to FIG. 2; and,

DETAILED DESCRIPTION OF THE INVENTION

Figure 1:
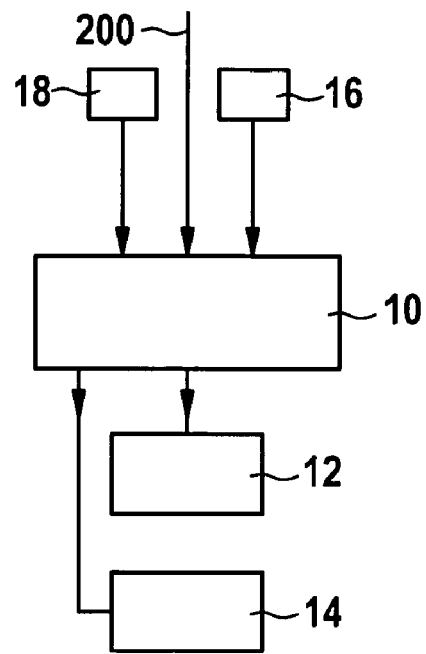
FIG. 1 is a simplified block diagram of a transmission control.

According to FIG. 1, a device for controlling an automatic transmission comprises electronic control device 10, with its exits being connected to selective actuator 12 and shift actuator 14. The entries of control devices 10 are connected to path sensors 16 and 18 as well as additional sensors, marked 200 in general, for example for the position of a drive pedal, operational parameters of the drive motor, the position of a selective lever, etc. Using path sensors 16 and 18 the position of one or more members in the operation of the transmission can be detected, as described in greater detail in the following.

Figure 2:
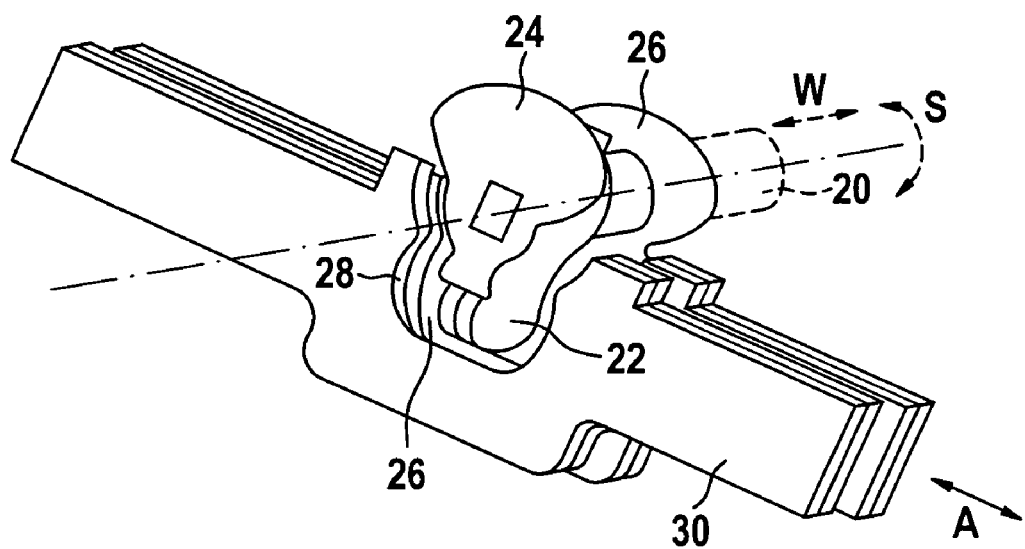
FIG. 2 is a perspective view of a part of a transmission with Active Interlock for a parallel transmission.

FIG. 2 shows essential components of a transmission in a perspective view. FIG. 3 shows a top view of the arrangement according to FIG. 2. A shifting device is shown having an Active Interlock Mechanism allowing a shift finger to be moved back out of a position engaging a gear into a neutral position and the gear engaged being disengaged before a new gear is engaged.

According to the figures, for the selection process, camshaft 20 can be rotated back and forth by selective actuator 12 in the direction of an axis, shown in dot-dash lines, i.e., in the direction of double arrow W. Using selective actuator 14 camshaft 20 can be rotated around its axis in the direction of double arrow S for engaging and disengaging gears. Camshaft 20 is connected in a fixed manner to shift finger 22 and disengagement elements 24 and 26 at a distance therefrom in both axial directions. Depending on the axial position the shift finger and the disengagement elements engage shift mouths 28 of shift bars and/or shift bars 30, which can be displaced back and forth in the direction of double arrow A and by which gears of a transmission can be engaged and disengaged.

Four shift bars $30_1$, $30_2$, $30_3$, and $30_4$ are shown, with shift bars $30_1$ and $30_3$ being allocated to a partial transmission of a double transmission and/or parallel transmission comprising the uneven gears and shift bars $28_2$ and $28_4$ being allocated to the partial transmission of a parallel transmission comprising the even gears.

In the position according to FIG. 3a) shift finger 22 is located in the mouth of shift bar $30_1$, while disengagement element 24 is located in the mouth of shift bar $30_3$. In the position according to FIG. 3b) the camshaft is displaced to a small extent so that shift finger 22 is located in the mouth of shift bar $30_2$ and disengagement element 24 is located in the mouth of shift bar $30_4$. In the partial figures c) and d) the camshaft is in each case shifted further downward so that shift finger 22 is located in the mouth of shift bar $30_3$ and/or $30_4$ and displacement element 24 is located in the mouth of the shift bar $30_1$ and/or shift bar $30_2$.

In FIG. 4, an arrangement operating in a manner known per se is explained:

It is assumed that the shift bar facing the viewer represents shift bar $30_4$, with disengagement element 24 being located in its mouth, while shift bar $30_2$ with shift finger 22 being located in its mouth is not shown.

FIG. 4a shows the arrangement in a neutral central position. The mouths of shift bars $30_4$ and $30_2$ are located in a position in which no gear is engaged. In the position according to FIG. 4b shift bar $30_2$ is displaced by shift finger 22 towards the left in order to engage a gear. In the position shown shift bar $30_4$ is still located in the neutral position, i.e., no gear is engaged. However, shift bar $30_2$ is located in a position displaced to the left, i.e., the shift bar is displaced in the direction of engaging gears. When camshaft 20 is rotated further in the clock-wise direction out of the position according to FIG. 4b all other (not shown) shift bars are displaced by disengagement element 24 towards the left, i.e., into the neutral position, prior to shift finger 22 displacing shift bar $30_2$ entirely to the left and engaging a new gear. Correspondingly, in FIG. 4c, this gear is disengaged by a reverse rotation of camshaft 20 via shift finger 22. By the engagement of the exterior circularly-cylindrical surfaces of disengagement element 24 according to FIG. 4d shift bar $30_4$ is locked and/or blocked in the neutral position while rear shift bar $30_2$, not shown, is displaced towards the left for engaging a gear.

Overall, the arrangement described provides that the shift finger can be moved out of an engaged camshaft of the partial transmission into a neutral position, without the gear engaged with the camshaft being disengaged. When a new gear is engaged it is ensured each time that the previously engaged gear is disengaged by the respective partial transmission. As shown, this is achieved in that the shift mouths are embodied distinctly larger than the shift finger and that by the circumferential geometry of the disengagement elements and the circumferential geometry of the shift mouths it is ensured that a gear engaged by a shift bar is disengaged before a new gear is engaged by another shift bar of the same partial transmission. Furthermore, the gear engaged in a partial transmission remains unaffected by the shift process in the other partial transmission.

The invention uses the possibilities provided by an Interlock Principle known per se for moving the shift finger out of a shift position into the neutral position and/or the selective position without disengaging the gear in order to control and/or verify if selective actuator 12 and its connection to camshaft 20 operate correctly.

Figure 5:
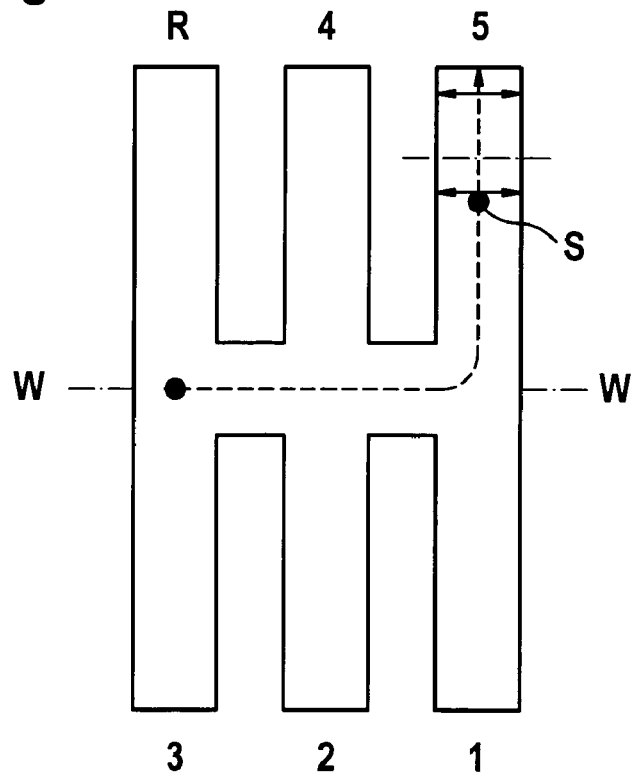
FIGS. 5 and 6 are diagrams of shift progressions for explaining the methods according to the invention.
Figure 6:
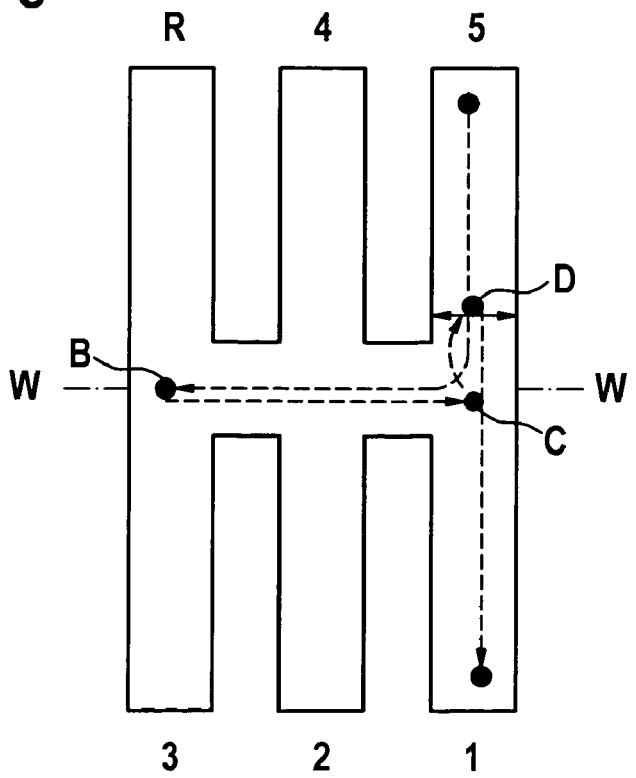

In FIGS. 5 and 6, respectively, a shifting crank known per se is shown, along which a guidance member (not shown) rigidly connected to the camshaft 20 can be displaced in a horizontal selective path W-W and the preferably perpendicularly thereto arranged shift paths, with the shifting crank being arranged and formed such that the motion of the guidance member, not shown, along the selective path is equivalent to the motion of shift finger 22 perpendicular to the paper level according to FIG. 4a) and that shift finger 22 during the motion along shift paths 3-R and/or 1-5 is located in the shift mouth of shift bar $30_1$ and/or $30_3$ and during the motion along shift path 24 in the shift mouth of shift bar $30_2$ and/or $30_4$.

With reference to FIG. 5 it is first assumed that, for example, driving occurs in the third gear so that the corresponding shift bar is located in the position in which the third gear is engaged. The shift finger can then be motioned into the neutral path and along the neutral path. When engaging the third gear, it was ensured by one of the corresponding disengagement elements that the shift bar allocated to gears 1 and 5 is moved into its neutral position, i.e., that no gear is engaged there. The shift finger can be moved along the selective path without driving in the third gear being affected. When the transmission control pre-selects one of gears 1 and 5 for the partial transmission the shift bar can be displaced by actuators 12 and 14 such that the shift finger is moved into position S, i.e., into a position prior to the shifting process itself engaging the $5^{th}$ gear, for example in front of the synchronization point, which is indicated in dot-dash lines. In position S the selective actuator can be reactivated in order to determine if the shift finger is actually located in shift path 1-5 by approaching one of the lateral edges of the shift path. The approaching of one of the edges can be determined by a rise in the power draw of selective actuator 12. The position is determined using one of path sensors 16 and/or 18, which may be an incremental sensor and for example be set to zero when approaching the end of the selective path. When a shifting shall occur out of the verified position S into gear 5 or gear 1, it is ensured that the shift finger is located in the right shift path.

The method described is not limited to an automated or automatic transmission provided with an Active Interlock System. It may also be performed in conventional transmissions, however here there is the disadvantage that during the verification no gear is engaged so that a certain time lag and/or a longer interruption of the drive force occurs.

Immediately after having verified the position S of FIG. 5, without any additional confirmation of a selective actuator, gear 5 of gear 1 can be engaged. When the shift path of another gear is to be shifted, the selective actuator must be activated again in which the verified position of the selective actuator may be serving as the original position from which the newly desired selected position is approached by actuating the selective actuator, for example by embodying the selective position sensor as an incremental sensor until the counted total has changed by the amount according to the distance of the shift paths.

Reaching the synchronization point during the movement of the shift finger along the shift path can be detected by an increased power draw of shift actuator 14 (FIG. 1) and/or by a slow-down of the speed of the shift finger.

As indicated in FIG. 5 at the upper end of shift path 15, when the end of the shift path has been reached, both a verification of the end of the shift path being reached (approach of the end stop) as well as a verification of the shift path may occur while by activating the selective actuator a sidewall of the shift path is approached.

FIG. 6 shows another example for verifying the correct function of the selective mechanism.

In FIG. 6 it is first assumed that the 5$^{th}$ gear is engaged and that the transmission and/or the shift finger moves into waiting position B at the end of the selective path allocated to shift path R-3. Here, it is additionally assumed that under the control of control device 10 the next waiting position is in turn allocated to shift path 1-5. The shift finger is then displaced by the selective actuator into position C, i.e., the position in the selective path allocated to shift path 1-5. During the waiting time a verification is performed of the correct function of the selective mechanism by moving the selective finger a short distance into position D in the area of shift path 1-5 allocated to the 5$^{th}$ gear and here a verification is performed by activating the selective actuator. After this verification it is ensured that the shift finger is located in shift path 1-5 so that in a subsequent shift order, for example to engage the first gear, the shift finger can immediately be moved into the position appropriate for engaging the 1$^{st}$ gear. When not the 1$^{st}$ gear but, for example, the 3$^{rd}$ gear is to be engaged, the shift finger is correspondingly moved beyond position B into shift path 3-R, so that the selective actuator, due to the verified knowledge of the position of shift path 1-5, can be addressed according to the distance between shift paths 3-R and 1-5.

It is immediately discernible in FIG. 6 that the following strategy is advantageous:

When the waiting position is in the selective path and no shift bars are moved, when the shift finger is moved in the direction of the gear allocated to the waiting position, the shift path allocated to the waiting position is used to verify the function of the selective mechanism.

When the waiting position is in the selective path and no shift bar is being moved, when the shift finger is moved in the opposite direction of the gear allocated to the waiting position, the shift path is used for a verification that is opposite to the one allocated to the waiting position.

In summary it is achieved with the invention that in transmissions equipped with an Active Interlock Mechanism, in particular parallel transmissions, the correct function of the selective mechanism and/or the position of the shift finger in the respectively correct shift path can be verified without any temporal delay, without a new target gear having been engaged. In this way, erroneous shift can be securely avoided. The invention can also be used in transmissions not provided with Active Interlock Systems, by verifying the position of the selective actuator and/or the position of the shift finger in a certain shift path by approaching the edge of the shift path using the activation of the selective actuator before the new gear is being engaged.

LIST OF REFERENCE CHARACTERS 10 control device
12 selective actuator
14 shift actuator
16 path sensor
18 path sensor
20 camshaft
22 shift finger
24 disengagement element
26 shift mouth
28 shift bar
30 shift bar

What we claim is:

1. A method for shifting gears of an automatic transmission, comprising the steps of:
   moving a shift finger (22) by a selective actuator (12) in a first direction along a selective path into a selective position;
   ceasing the movement of the shift finger (22) in the first direction by the selective actuator (12) along the selective path before the shift finger (22) contacts an edge substantially orthogonal to the first direction and aligned with the selective path in the first direction;
   moving said shift finger (22) out of said selective position via a shift actuator (14) into a shift path, wherein the shift finger (22) always engages a gear when it is moved into an end region of the shift path and the shift path is at least partially defined by substantially parallel respective shift path edges substantially orthogonal to the first direction; and,
   when the shift finger (22) is aligned in the first direction with the respective shift path edges and prior to engagement of a new gear within the shift path, activating the selective actuator (12) so that the shift finger (22) is moved in the first direction to contact a respective shift path edge for verifying the correct function of the selective actuator (12) and its connection to the shift finger (22).

2. The method according to claim 1, wherein the shift finger (22) is moved back into the selective path after a gear has been engaged without disengaging the engaged gear.

3. The method according to claim 1, wherein the selective actuator (12) is activated for verification when the shift finger (22), during its movement along a shift path for a respective gear, reaches a synchronization position for synchronizing the respective gear.

4. The method according to claim 2, wherein the shift finger (22), after a gear has been engaged, is moved into the selective path and is moved into a shift path of a gear still engaged for verification purposes.

5. A method for shifting gears of an automatic transmission, comprising the steps of:
   moving a shift finger (22) by a selective actuator (12) in a first direction along a selective path into a selective position;
   moving said shift finger (22) out of the selective position via a shift actuator (14) into a shift path, wherein the shift finger (22) always engages a gear when it is moved into an end region of the shift path and the shift path is at least partially defined by substantially parallel respective shift path edges substantially orthogonal to the first direction; and,
   when the shift finger (22) is aligned in the first direction with the respective shift path edges and prior to engagement of a new gear within the shift path, activating the selective actuator (12) so that the shift finger (22) is moved in the first direction and in a second direction, opposite the first direction, to contact the respective shift path edges for verifying the correct function of the selective actuator (12) and its connection to the shift finger (22).

* * * * *